(12) United States Patent
Yamamoto et al.

(10) Patent No.: US 7,532,236 B2
(45) Date of Patent: May 12, 2009

(54) CAMERA SYSTEM

(75) Inventors: Takahiro Yamamoto, Mishima-gun (JP); Takahiro Iwasawa, Kyoto (JP); Kouzirou Yoneda, Takatsuki (JP)

(73) Assignee: Panasonic Corporation, Osaka (JP)

( * ) Notice: Subject to any disclaimer, the term of this patent is extended or adjusted under 35 U.S.C. 154(b) by 619 days.

(21) Appl. No.: 11/199,171

(22) Filed: Aug. 9, 2005

(65) Prior Publication Data

US 2006/0033966 A1    Feb. 16, 2006

(30) Foreign Application Priority Data

Aug. 16, 2004    (JP)    ............... 2004-236528

(51) Int. Cl.
*H04N 5/228*    (2006.01)
(52) U.S. Cl. ............... 348/208.6; 348/208.16
(58) Field of Classification Search ............... None
See application file for complete search history.

(56) References Cited

FOREIGN PATENT DOCUMENTS

JP    2001-358999 A    12/2001

*Primary Examiner*—Lin Ye
*Assistant Examiner*—Temitope Adeyiga
(74) *Attorney, Agent, or Firm*—McDermott Will & Emery LLP

(57) ABSTRACT

A camera system comprising an imaging unit scanned by means of an X-Y address method, horizontal and vertical scanning units for scanning the imaging unit by means of the X-Y address method, a main scanning direction control signal generating unit for generating a main scanning direction control signal for designating a main scanning direction of the imaging unit, a main scanning direction control unit for controlling the horizontal and vertical scanning units so that the main scanning direction coincides with a direction instructed by the main scanning direction control signal, and an output unit for outputting an image signal read in consequence of scanning the imaging unit using the horizontal and vertical scanning units.

13 Claims, 9 Drawing Sheets

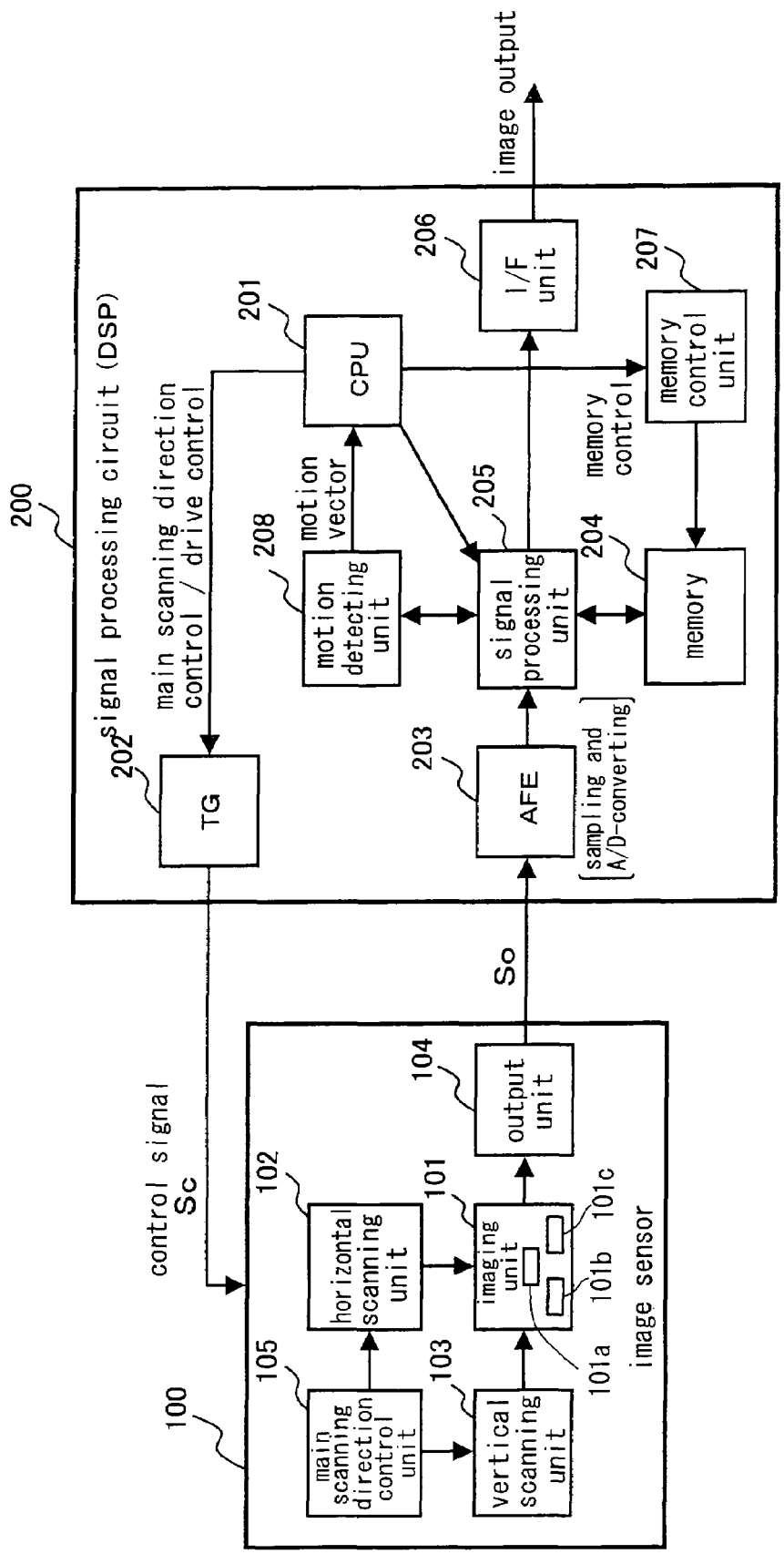

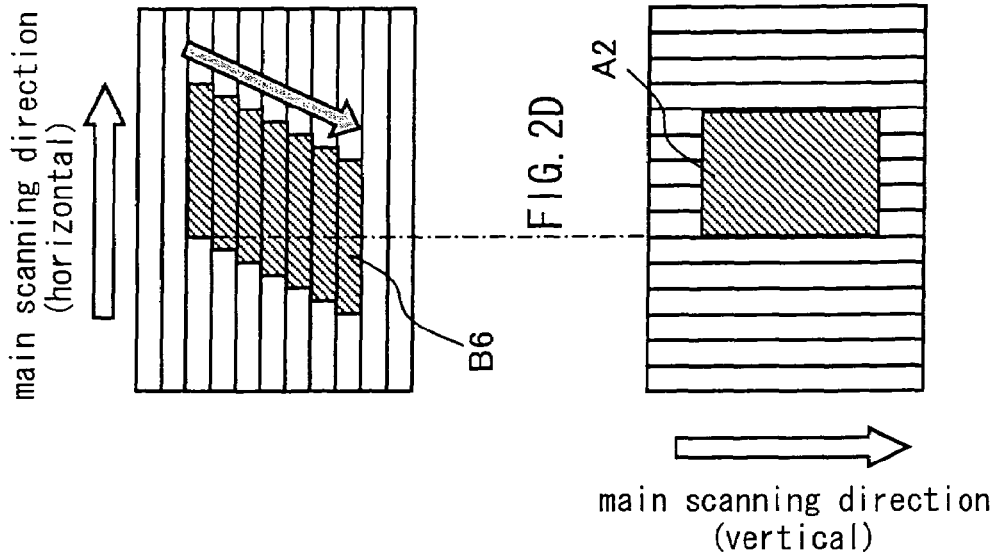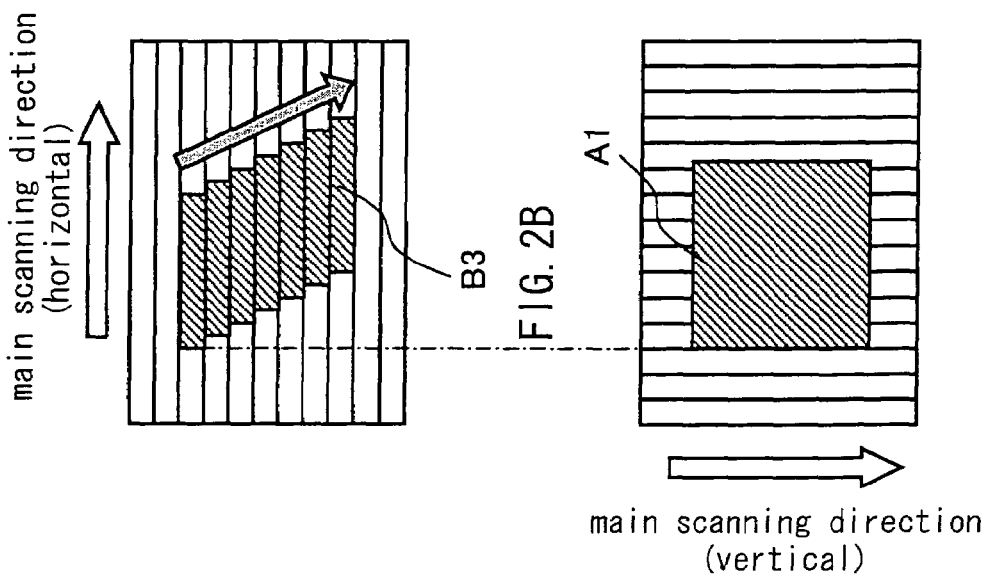

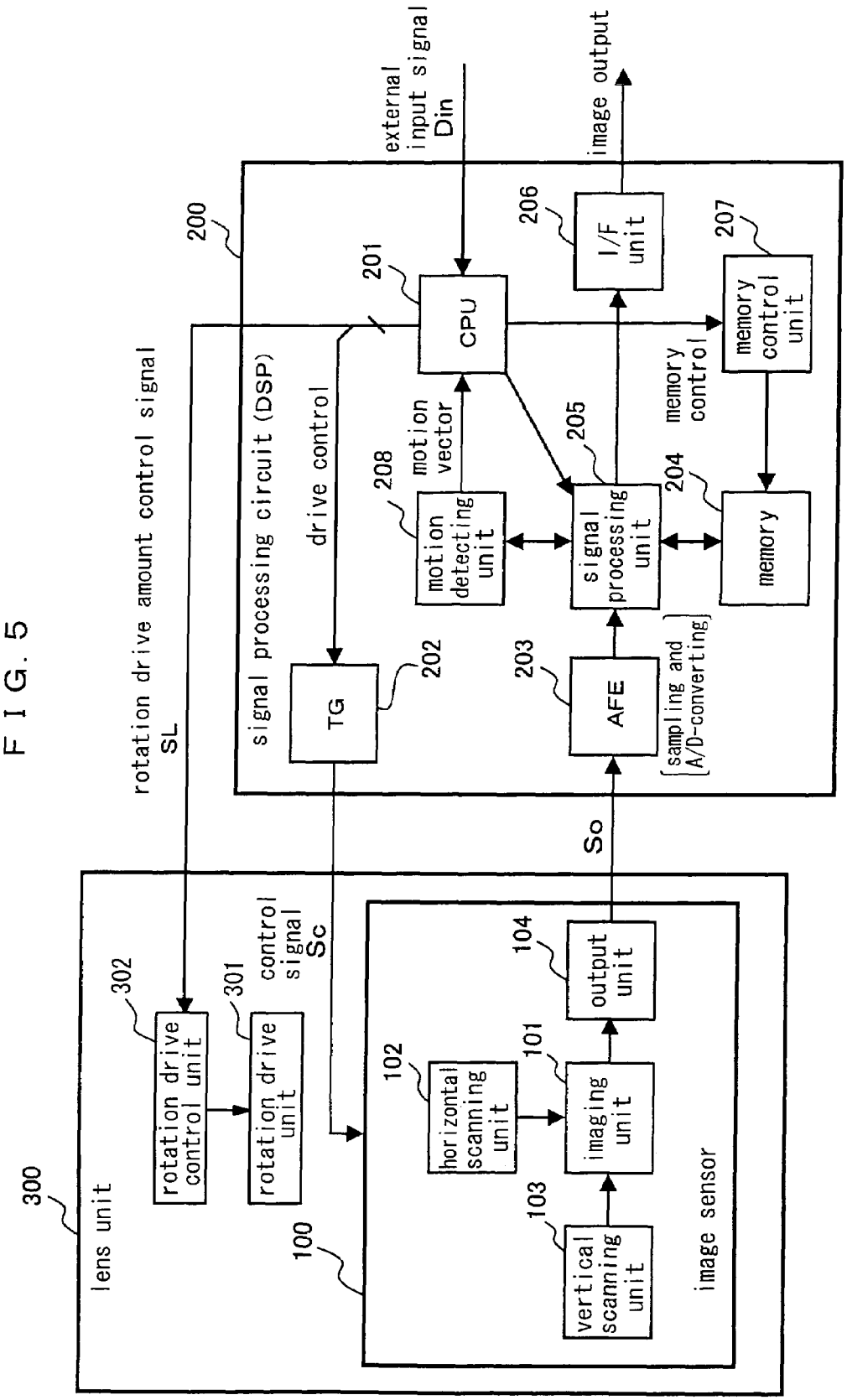
F I G. 5

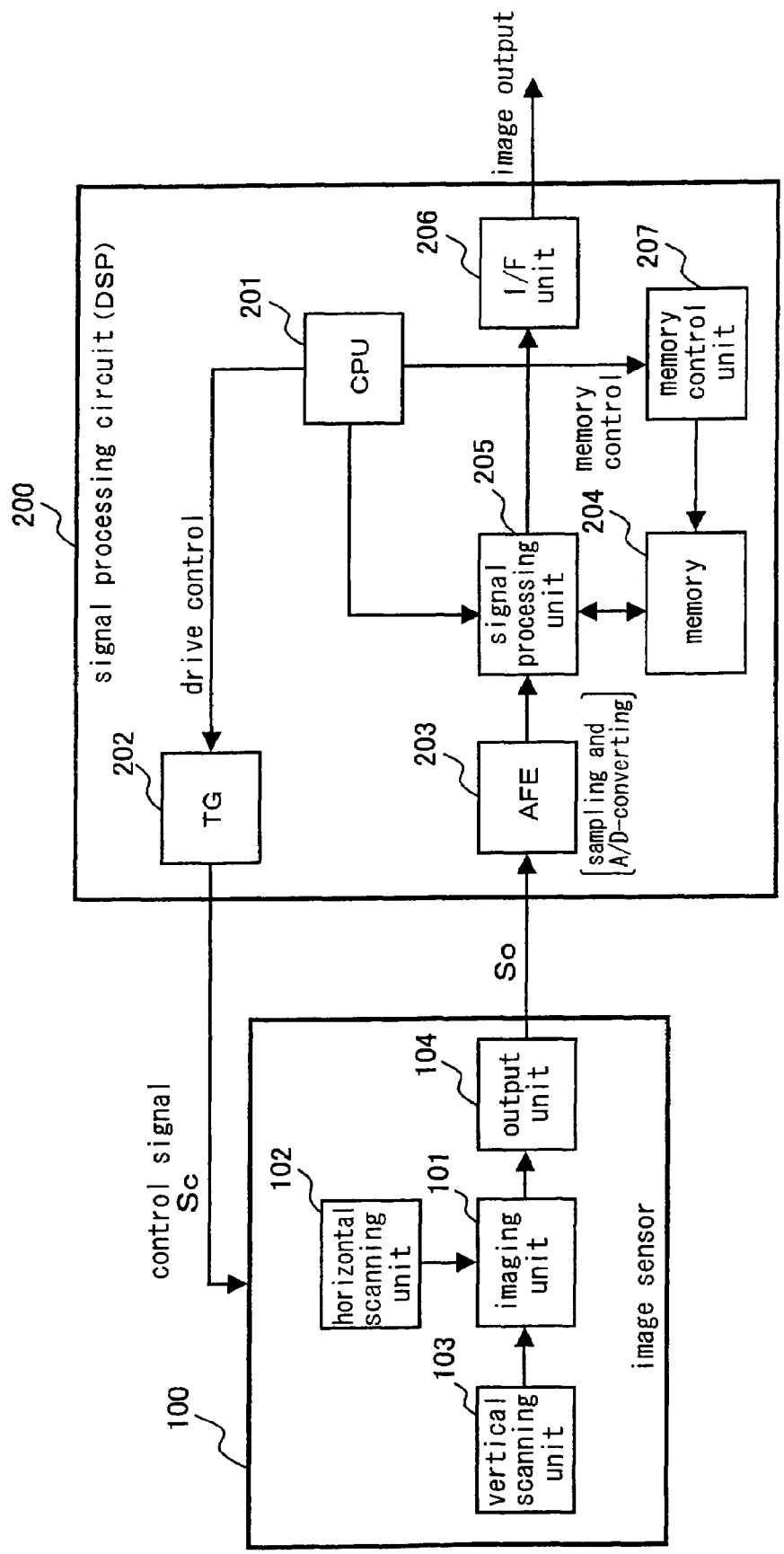
FIG. 8 -- PRIOR ART --

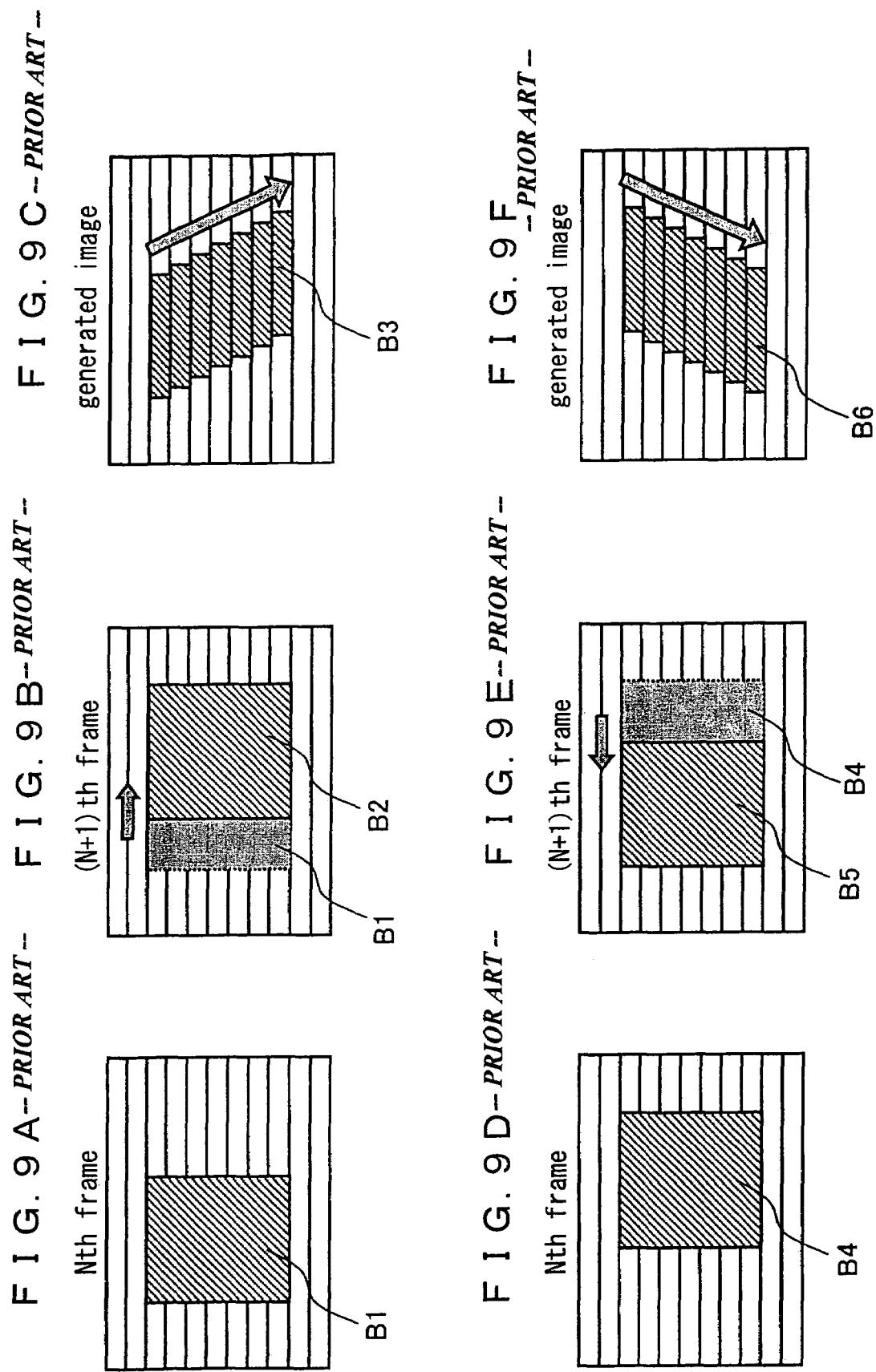

CAMERA SYSTEM

BACKGROUND OF THE INVENTION

1. Field of the Invention

The present invention relates to a camera system for signal-processing an output signal of an image sensor and outputting an image, and the image sensor used in the camera system.

2. Description of the Related Art

A problem of an MOS (Metal Oxide Semiconductor) image sensor was generally to generate a larger noise in comparison to a CCD (Charge Coupled Device) image sensor, however, the noise-related problem has already been improved due to an advancement in the technology. The MOS image sensor can be integrated on a single chip, downsized and easily highly integrated. Further, the MOS image sensor can be driven by a single power supply of 2.9 volts or the like, and advantageously consumes less power in comparison to the CCD image sensor. Because of the mentioned advantages, the MOS image sensor is increasingly adopted for a mobile device, a typical example of which is a camera-equipped mobile telephone, in recent years.

FIG. 8 shows a camera system in which a conventional image sensor is used. In FIG. 8, a reference numeral 100 denotes an image sensor of a line exposure comprising an imaging unit (area sensor) 101 scanned by means of an X-Y address method, a horizontal scanning unit 102 for horizontally scanning the imaging unit 101 by means of the X-Y address method, a vertical scanning unit 103 for vertically scanning the imaging unit 101 by means of the X-Y address method, and an output unit 104 for outputting an image signal So read in consequence of scanning the imaging unit 101 using the horizontal scanning unit 102 and the vertical scanning unit 103.

The imaging unit 101 has a structure in which a unit pixel is arrayed in a horizontal-vertical matrix shape. The unit pixel comprises a photoelectric conversion element for photoelectrically converting an incident light, a reading section for reading an imaging signal obtained by the photoelectric conversion element, and a reset section for resetting the photoelectric conversion element.

A reference numeral 200 denotes a signal processing circuit (DSP) comprising a CPU 201 in charge of system management, a timing generator (TG) 202 for outputting a control signal (sensor driving pulse) Sc for drive-controlling the image sensor 100 by a drive control from the CPU 201, an AE (analog front end) 203 for sampling and A/D-converting the image signal So outputted from the image sensor 100, a signal processing unit 205 for signal-processing a digital signal outputted from the AFE 203 using a memory 204 in accordance with an instruction of the CPU 201, the memory 204 for memorizing the image signal obtained by the signal processing unit 205, an I/F (interface) unit 206 for externally outputting the signal processed in the signal processing unit 205, and a memory control unit 207 for controlling the memory 204 in accordance with the instruction of the CPU 201.

The horizontal scanning unit 102 and the vertical scanning unit 103 for scanning the imaging unit 101 by means of the X-Y address method are driven by the control signal Sc of the timing generator 202.

FIGS. 9A through 9F show a motion of a photographic subject on an image photographed using the camera system of FIG. 8. In the image sensor of the line exposure such as the MOS image sensor, a light-receiving time is different in each line (focal-plane accumulation). To be more specific, the "concurrency of the accumulation" is absent in the lines in the case of the image sensor of the line exposure. As a result, when the photographic subject moves, in particular, in a same direction (parallel or non-parallel) as a main scanning direction of the imaging unit (shown by → in FIG. 9), a distortion is more possibly generated in an image. Such a phenomenon is typically generated in the image sensor of the line exposure in which a reading operation is executed in the per line.

FIGS. 9A through 9C show how the photographic subject moves in the horizontally direction to right. In FIG. 9A, a reference symbol B1 denotes the photographic subject in a Nth frame. In FIG. 9B, a reference symbol B2 denotes the photographic subject in an (N+1)th frame subsequent to the Nth frame. FIG. 9C shows an output image B3 when the motion of the photographic subject shown in FIGS. 9A and 9B is imaged by the image sensor 100 of the line exposure. As shown in FIG. 9C, such a distortion as continuous from the upper left toward the lower right is generated in the output image B3.

FIGS. 9D through 9F show how the photographic subject moves in the horizontally direction to left. In FIG. 9D, a reference symbol B4 denotes the photographic subject in the Nth frame. In FIG. 9E, a reference symbol B5 denotes the photographic subject in the (N+1)th frame. FIG. 9F shows an output image B6 when the motion of the photographic subject shown in FIGS. 9D and 9E is imaged by the image sensor 100 of the line exposure. As shown in FIG. 9F, such a distortion as continuous from the upper right toward the lower left is generated in the output image B6.

Apart from the motion of the photographic subject, it was proposed by No. 2001-358999 of the Publication of the Unexamined Japanese Patent Applications (hereinafter, referred to as conventional technology) that a motion with respect to a camera shake due to a hand movement was detected so as to calculate and change a reading position of the MOS image sensor (image sensor).

An image signal whose entire pixels are received in a same period is sequentially transferred and read in the case of the image sensor of the charge-transfer type such as the CCD. Therefore, a time difference is not generated in the light-receiving time per pixel (concurrent accumulation). In contrast to that, the line exposure for reading image information per line is generally adopted in the case of the image sensor comprising the imaging unit of the X-Y address method such as the MOS image sensor as described, wherein the light-receiving time is different in each line and the image may consequently be distorted depending on the motion of the photographic subject as described earlier.

A proposed countermeasure for dealing with the distorted image is to shorten the light-receiving time of each pixel, which, however, still cannot prevent the distortion generated between the lines.

In the conventional technology, the distortion generated by the camera shake is corrected by controlling a reading address per pixel based on the detection of the motion. However, the control operation in each line of the MOS image sensor is unfavorably complicated, and a structure of the MOS image sensor is also complicated.

Further, an example of the mobile device, such as the camera-equipped mobile telephone, has a structure in which a lens unit is rotated. In the structure, however, it is difficult to prevent the distortion generated in the image using the conventional technology alone.

An MOS image sensor of a global shutter type in which the concurrency of the accumulation is pursued is available, however, the MOS image sensor currently has too a difficult structure to be adopted for the mobile device.

Though there is a method in which the light-receiving time is adjusted by a mechanical shutter, a height of the lens unit is increased and it becomes necessary to control the mechanical shutter in adopting the method, which unfavorably increases a cost of the lens unit. Therefore, the method is not suitable for the mobile device.

SUMMARY OF THE INVENTION

Therefore, a main object of the present invention is to provide a structure for correcting an image distortion suitable for a mobile device.

In order to solve the foregoing problems, a camera system according to the present invention comprises an imaging unit scanned by means of an X-Y address method, horizontal and vertical scanning units for scanning the imaging unit by means of the X-Y address method, a main scanning direction control signal generating unit for generating a main scanning direction control signal for designating a main scanning direction of the imaging unit, a main scanning direction control unit for controlling the horizontal and vertical scanning units so that the main scanning direction coincides with a direction instructed by the main scanning direction control signal, and an output unit for outputting an image signal read in consequence of scanning the imaging unit using the horizontal and vertical scanning units.

According to the foregoing constitution, in a state in which a photographic subject in the processed image signal moves in a same direction as the main scanning direction (parallel/non-parallel state), the main scanning direction control signal is supplied to the main scanning direction control unit so that the main scanning direction can be changed to a direction different to the direction of the motion of the photographic subject.

For example, when the photographic subject moves in the horizontal direction in the case in which the main scanning direction is the horizontal direction, the main scanning direction is changed from the horizontal direction to the vertical direction. More specifically, a main scanning unit is changed from the horizontal scanning unit to the vertical scanning unit, while a sub scanning unit is chanted from the vertical scanning unit to the horizontal scanning unit.

Contrary to the foregoing case, when the photographic subject moves in the vertical direction in the case in which the main scanning direction is the vertical direction, the main scanning direction is changed from the vertical direction to the horizontal direction. More specifically, the main scanning unit is changed from the vertical scanning unit to the horizontal scanning unit, while the sub scanning unit is chanted from the horizontal scanning unit to the vertical scanning unit. Thus, the imaging unit (area sensor) is main-scanned/sub-scanned, and the obtained image signal is outputted via the output unit.

In the case of the image sensor according to the present invention, though the image signal is concurrently read per scanning line by means of the line exposure, the main scanning direction of the imaging unit can be appropriately changed depending on the motion of the photographic subject. As a result, a distorted image, which is a typical phenomenon generated by the focal plane shutter, can be improved.

In the camera system according to the present invention, the imaging unit preferably comprises a photoelectric conversion element for photoelectrically converting an incident light, a reading section for reading an imaging signal obtained by the photoelectric conversion element and a reset section for resetting the photoelectric conversion element, wherein a unit pixel is arrayed in a vertical-horizontal matrix shape. A typical example of the imaging unit is an MOS image sensor.

In the camera system according to the foregoing constitution, the main scanning direction control signal generated in accordance with a motion vector of the photographic subject generated based on the image signal from the output unit is preferably used.

In the foregoing camera system, a memory for temporarily memorizing the image signal outputted from the output unit is preferably further included.

In the constitution including the memory, the image signal resulting from a signal processing is temporarily memorized in the memory when the main scanning direction is changed, and the image direction is changed to the original direction when the image signal is read from the memory. In the same manner as described earlier, the main scanning direction of the imaging unit can be appropriately changed depending on the motion of the photographic subject though the image signal is concurrently read per scanning line because the line exposure is employed. As a result, the camera system capable of improving the distorted image typically generated by the focal plane shutter and obtaining an undistorted image can be realized.

The camera system according to the foregoing constitution preferably further includes a memory control unit, wherein the memory control unit temporarily memorizes the image signal outputted from the output unit in the memory when the main scanning direction is changed by the main scanning direction control unit, and further vertically and horizontally changes the image direction when the image signal is read from the memory. Then, the direction of the obtained image can be normalized because the image signal whose direction is vertically and horizontally changed is read from the memory.

In the camera system according to the foregoing constitution, the main scanning direction control signal generating unit preferably generates the main scanning direction control signal only when the camera system is in a predetermined state. Because the main scanning direction control signal is not generated when the camera system is not in the predetermined state, power consumption can be prevented from increasing.

The predetermined state includes a few examples such as the following. In the case in which the camera system further comprises a lens unit including the imaging unit and provided so as to freely rotate relative to the camera system, the predetermined state can be a state in which the lens unit is rotated.

In the case in which the foregoing camera system further includes a shutter for controlling an exposure time (photographing time) based on an operation by an operator (shutter is generally provided), the predetermined state can be a state in which the shutter is operated.

In the case in which the foregoing camera system further includes a camera shake detecting unit for detecting a camera shake due to a hand movement generated when the operator operates the camera system, the predetermined state can be a state in which the camera shake is detected by the camera shake detecting unit.

In the case in which the foregoing camera system further includes a moving image encoding unit for executing a moving image encoding processing to the image signal outputted from the output unit, the predetermined state can be a state in which a moving image encoding amount in the moving image encoding processing by the moving image encoding unit exceeds a previously specified value.

In recording and communicating a moving image signal, the moving image is generally encoded in order to reduce a capacitance, in which case the image may be distorted when the moving image encoding amount is excessive. In order to deal with the problem, the moving image encoding amount is detected and the main scanning direction of the imaging unit is controlled in accordance with a result of the detection so that the image distortion can be prevented.

In the case in which the foregoing camera system further includes a defect correcting unit for correcting a pixel defect of the imaging unit and capable of changing a direction in which the pixel defect is corrected, the predetermined state can be a state in which the pixel defect correcting direction is changed by the defect correcting unit. The imaging unit may possibly undergo a white defect or a black defect due to a pixel defect on a process. In order to deal with the possible defective image, the image sensor is provided with the defect correcting unit, however, an effect of the defect correction may be different in the horizontal and vertical directions. Therefore, the defect correcting direction is changed by the operation of the operator when necessary, wherein the defect is corrected by controlling the main scanning direction of the imaging unit when the defect is conspicuous. Thereby, an image quality can be improved.

The present invention can be developed as follows with respect to a camera system comprising an image sensor not provided with the main scanning direction control unit for controlling the horizontal and vertical scanning units in accordance with the main scanning direction control signal.

The camera system comprises a lens unit comprising an image sensor, an output unit for outputting an image signal read from the lens unit, a rotation drive unit for rotating the lens unit, a rotation drive amount control signal generating unit for generating a motion vector of the photographic subject from the image signal, determining a rotation drive amount of the rotation drive unit based on the generated motion vector and generating a rotation drive control signal for designating the determined rotation drive amount, and a rotation drive control unit for controlling the rotation drive unit based on the rotation drive amount control signal.

When the direction of the motion of the photographic subject in the processed image signal coincides with the main scanning direction (parallel or non-parallel), the rotation drive control signal is supplied to the rotation drive control unit. Accordingly, the rotation of the lens unit is controlled so that the direction of the motion of the photographic subject in the image signal does not coincide with the main scanning direction. At that time, the main scanning direction is not changed.

The main scanning direction of the imaging unit is mostly the horizontal direction. For example, when the actual photographic subject moves in the horizontal direction, the lens unit is rotated. As a result, the direction in which the photographic subject moves in the processed image signal is different to the main scanning direction. Therefore, though the reading operation of the image sensor per scanning line is concurrently executed because the line exposure is employed, the rotation phase of the lens unit can be appropriately changed in accordance with the motion of the photographic subject. Thereby, the camera system capable of improving the distorted image, which is a characteristic of the focal plane shutter, and obtaining the undistorted image can be realized.

In the foregoing case, the foregoing operation is realized by rotating the lens unit including the image sensor, and the main scanning direction of the imaging unit is not changed. As a result, it becomes unnecessary to adjust the image output direction using the memory.

The camera system according to the present invention further comprises a moving image encoding unit for executing a moving image encoding processing to the image signal. The moving image encoding unit preferably shifts to an intra-encoding processing using a spatial redundancy when the rotation drive control of the rotation drive unit is executed by the rotation drive control unit in a state in which an inter-encoding processing for encoding an inter-frame differential using a temporal redundancy is executed.

Further, the rotation drive control unit preferably inactivates the rotation drive amount control signal during at least one frame when the main scanning direction of the imaging unit is changed.

When the main scanning direction of the imaging unit is changed or the lens unit is rotated, a relationship in the inter-frame temporal redundancy in the moving image encoding may be disturbed. In such a case, the intra-encoding processing in which the inter-frame differential is not encoded is executed. Thereby, the generation of the distorted image can be controlled without disturbing the image when the moving image encoding processing is executed. When the main scanning direction is often changed or the lens unit is often rotated, the output image may possibly be disturbed. Therefore, it is recommended that the intra-encoding processing be executed under the per-frame management.

According to the present invention, though the reading operation of the image sensor per scanning line is concurrently executed because the line exposure is employed, the main scanning direction of the imaging unit is changed or the lens unit is rotated in accordance with the motion of the photographic subject. Thereby, the distorted image, which is a characteristic of the focal plane shutter, can be prevented.

The present invention is also effective for improving the corrections of the hand-movement blur and the defect. Further, the present invention can be effectively adopted for a camera system including a moving image encoding processing such as MPEG so as to attain the effect of controlling the increase of the encoding amount due to the image distortion typically generated by the image sensor of the line exposure. In the foregoing camera system, it becomes unnecessary to provide the mechanical shutter and the like, which allows the system to be inexpensively designed, while simplifying the structure. Therefore, the present invention is suitable for a mobile camera system such as a mobile telephone.

The image sensor/camera system according to the present invention, which are capable of controlling the image distortion typically generated by the image sensor such as the MOS image sensor using the focal plane shutter, is effective for the mobile camera system such as DSC (digital still camera) and a camera-equipped mobile telephone.

BRIEF DESCRIPTION OF THE DRAWINGS

These and other objects as well as advantages of the invention will become clear by the following description of preferred embodiments of the invention, and a number of benefits not recited in this specification will be known to the skilled in the art upon the implementation of the present invention.

FIG. 1 is a block diagram illustrating a constitution of a camera system according to a preferred embodiment 1 of the present invention.

FIGS. 2A-2D are descriptive views of controlling an image distortion in the camera system according to the preferred embodiment 1.

FIG. 5 is a block diagram illustrating a constitution of a camera system according to a preferred embodiment 3 of the present invention.

FIG. 8 is a block diagram illustrating a constitution of a camera system according to a conventional technology.

FIGS. 9A-9F are descriptive views of a motion of a photographic subject picked up by the camera system according to the conventional technology and an image distortion.

DESCRIPTION OF THE INVENTION

Figure 3:
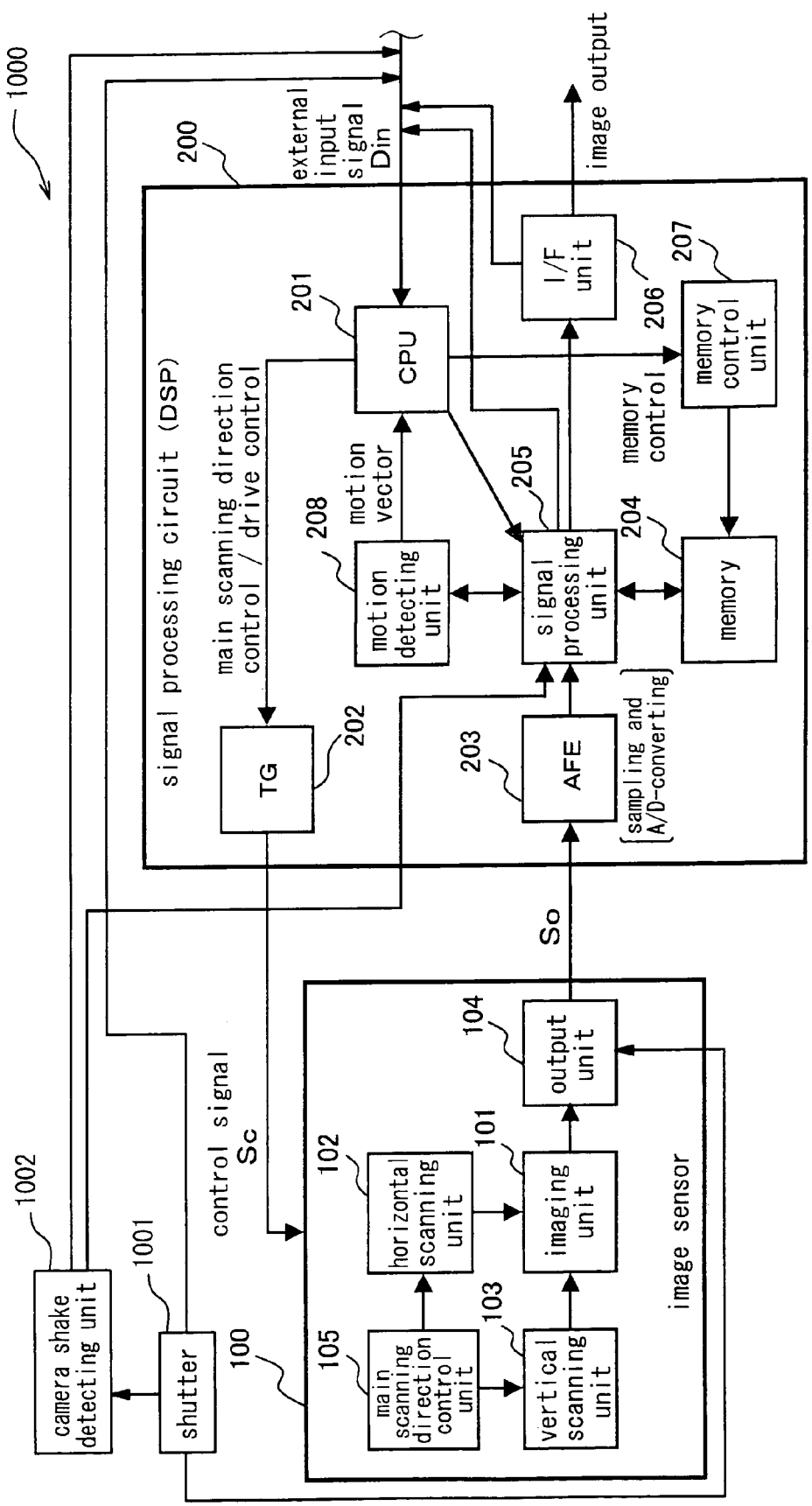
FIG. 3 is a block diagram illustrating a constitution of a camera system according to a preferred embodiment 2 of the present invention.

Hereinafter, preferred embodiments of the present invention are described referring to the drawings. The respective drawings show that a memory, a timing generator and AFE are installed inside a signal processing circuit (DSP), however, they may be installed outside the signal processing circuit.

Embodiment 1

FIG. 1 is a block diagram illustrating a constitution of a camera system according to a preferred embodiment 1 of the present invention. The camera system comprises an image sensor 100 and a signal processing circuit 200.

In FIG. 1, the reference numeral 100 denotes the image sensor of a line exposure comprising an imaging unit (area sensor) 101 scanned by means of an X-Y address method, a horizontal scanning unit for horizontally scanning the imaging unit 101 by means of the X-Y address method, a vertical scanning unit 103 for vertically scanning the imaging unit 101 by means of the X-Y address method, an output unit 104 for outputting an image signal read in consequence of scanning the imaging unit 101 using the horizontal scanning unit 102 and the vertical scanning unit 103, and a main scanning direction control unit 105 for controlling the horizontal scanning unit 102 and the vertical scanning unit 103 in accordance with a main scanning direction control signal for determining if a main scanning direction is the horizontal direction or the vertical direction.

The imaging unit 101 is comprised of an MOS image sensor comprising a photoelectric conversion element 101a for photoelectrically converting an incident light, a reading section 101b for reading an imaging signal obtained by the photoelectric conversion element 101a, and a reset section 101c for resetting the photoelectric conversion element 101a. The imaging unit 101 has a structure in which a unit pixel is arrayed in a horizontal-vertical matrix shape.

The signal processing circuit 200 is an example of a main scanning direction control signal generating unit and is comprised of DSP (Digital Signal Processor).

The signal processing circuit 200 comprises a CPU 201, a timing generator (TG) 202, an AFE (analog front end) 203, a memory 204, a signal processing unit 205, an I/F (Interface) unit 206, a memory control unit 207, and a motion detecting unit 208.

The CPU 201 is in charge of system management. The timing generator (TG) 202 outputs a control signal (sensor drive pulse) Sc for drive-controlling the image sensor 100. The control signal (sensor drive pulse) Sc includes the main scanning direction control signal. The timing generator (TG) 202 is operated based on a drive control by the CPU 201. The AFE (analog front end) 203 samples and AD-converts an image signal So outputted from the image sensor 100. The memory 204 temporarily memorizes the image signal in order to execute a signal processing in the signal processing unit 205. The signal processing unit 205 executes the signal processing to a digital signal outputted from the AFE 203. The signal processing is executed by means of the memory 204 in accordance with an instruction of the CPU 201. The I/F (Interface) unit 206 externally outputs the signal processed in the signal processing unit 205. The memory control unit 207 controls the memory 204 in accordance with the instruction of the CPU 201. The motion detecting unit 208 detects a motion of a photographic subject based on a result of the processing by the signal processing unit 205.

The motion detecting unit 208 detects the motion of the photographic subject as a motion vector based on the processing result of the signal processing unit 205 and supplies a result of the detection to the CPU 201. The CPU 201 determines the main scanning direction in the image sensor 100 based on the supplied motion vector information of the photographic subject and transmits the main scanning direction control signal indicating a result of the determination to the image sensor 100 via the timing generator 202. The main scanning direction control signal is supplied to the image sensor 100 as the control signal Sc.

The CPU 201 compares the current main scanning direction to a direction in which the photographic subject moves in the image signal currently being processed, and supplies an instruction that the current main scanning direction is to be maintained to the image sensor 100 as the main scanning direction control signal Sc when the compared directions do not coincide with each other. On the contrary, when the directions coincide with each other, the CPU 201 supplies an instruction that the main scanning direction is to be changed through 90 degrees to the image sensor 101 as the main scanning direction control signal Sc.

More specifically, in the case of judging that the direction of the motion of the photographic subject in the image signal currently being processed is the horizontal direction when the current main scanning direction is the horizontal direction, the main scanning direction control signal including the instruction that the vertical direction different to the current main scanning direction by 90 degrees is set as the main scanning direction is transmitted. On the contrary, in the case of judging that the direction of the motion of the photographic subject in the image signal currently being processed is the vertical direction when the current main scanning direction is the vertical direction, the main scanning direction control signal including the instruction that the horizontal direction different to the current main scanning direction by 90 degrees is set as the main scanning direction is transmitted. Thus, the CPU 201 functions as the main scanning direction control signal generating unit.

The main scanning direction control unit 105 controls the horizontal scanning unit 102 and the vertical scanning unit 103 based on the main scanning direction control signal Sc received from the signal processing circuit 200 so that the main scanning direction follows the direction indicated in the instruction of the main scanning direction control signal Sc.

Next, an operation of the camera system according to the present embodiment constituted as above is described. FIG. 2A corresponds to FIG. 9C in a conventional technology. The main scanning direction in FIG. 2A is the horizontal direction. In the drawing, an image B3 undergoes a distortion because the photographic subject moves along the horizontal direction from left to right with the main scanning direction continuously set as the horizontal direction. In the preferred embodiment 1, therefore, the main scanning direction is changed to the vertical direction based on the detection that the direction of the motion of the photographic subject is in parallel with the main scanning direction. FIG. 2B shows an image A1 photographed in the state in which the main scanning direction is changed to the vertical direction without changing the direction of the motion of the photographic subject in FIG. 2A. When the main scanning direction is changed to the direction different to the direction of the motion of the photographic subject as shown in FIG. 2B, the image distortion disappears from the image A1.

FIG. 2C corresponds to FIG. 9F in the conventional technology. The main scanning direction in FIG. 2F is the horizontal direction. In the drawing, an image B6 undergoes a distortion because the photographic subject moves along the horizontal direction from right to left with the main scanning direction continuously set as the horizontal direction. In the preferred embodiment 1, therefore, the main scanning direction is changed to the vertical direction based on the detection that the direction of the motion of the photographic subject is in parallel with the main scanning direction. FIG. 2D shows an image A2 photographed in the state in which the main scanning direction is changed to the vertical direction without changing the direction of the motion of the photographic subject in FIG. 2C. When the main scanning direction is changed to the direction different to the direction of the motion of the photographic subject as shown in FIG. 2D, the image distortion disappears from the image A2.

It is assumed that the main scanning direction control signal by the CPU 201 is in a state of a normal mode in which the horizontal direction is to be set as the main scanning direction when a still image or a moving image is photographed. Further assuming that the photographic subject is photographed in the foregoing state and the motion detecting unit 208 detects that the motion vector of the photographic subject is directed from left to right or from right to left along the horizontal direction, the CPU 201 generates the main scanning direction control signal Sc indicating that the vertical direction is the main scanning direction. Then, the CPU 201 transmits the generated main scanning direction control signal Sc to the image sensor 100 via the timing generator 202. The main scanning direction control unit 105 receives the main scanning direction control signal Sc and controls the vertical scanning unit 103 and the horizontal scanning unit 102 in such manner that the scanning by the vertical scanning unit 103 is set as a main scanning and the scanning by the horizontal scanning unit 102 is set as a sub scanning.

Therefore, as shown in FIGS. 2B and 2D, the imaging unit 101 is scanned in the state in which the main scanning direction is the vertical direction, and the direction in which the image signal is concurrently read is changed from the horizontal direction to the vertical direction. Thereby, all of the lines can be concurrently read in spite of the motion of the photographic subject.

The image signal So outputted from the output unit 104, which results in a horizontally and vertically converted signal in comparison to the ordinary, is reversely converted in the horizontal and vertical directions using the memory 204 when the signal processing is executed in the signal processing unit 205 of the signal processing circuit 200. More specifically, the image signal obtained in consequence of signal-processing the image signal So is directly temporarily memorized in the memory 204, and horizontally and vertically converted into the original sate when the image signal is read from the memory 204. As a result, the respective outputted images are as shown in A1 and A2. The image A1 in the case of the photographic subject moving from left to right in the drawing is slightly larger in width, while the image A2 in the case of the photographic subject moving from right to left in the drawing is slightly smaller in width. In either of the images, the image distortion resulting from the operation of the focal plane shutter is controlled.

As described, according to the preferred embodiment 1, in the camera system comprising the image sensor capable of changing the main scanning direction, the main scanning direction of the imaging unit 101 is changed only when the main scanning direction of the imaging unit 101 and the direction of the motion of the photographic subject in the processed image signal coincide with each other in the comparison result. Thereby, the generation of the image distortion resulting from the operation of the focal plane shutter can be controlled.

Embodiment 2

FIG. 3 is a block diagram illustrating a constitution of a camera system according to a preferred embodiment 2 of the present invention. In the preferred embodiment 2, the present invention is applied to a device provided with a lens unit (camera) 1000 so as to rotate relative to a main body of the device. The lens unit 1000 includes an image sensor 100, or the image sensor 100 and a signal processing circuit (DSP) 200.

The basic operation and how the main scanning direction is determined based on the motion vector information of the photographic subject in the preferred embodiment 2 are the same as in the preferred embodiment 1. The preferred embodiment 2 is different to the embodiment 1 in that an external input signal Din is inputted to the CPU 201.

In some of the mobile devices such as the mobile telephone, the lens unit 1000 is provided so as to rotate with respect to the main body of the mobile device. The lens unit 1000 is rotated in such manner that a rotation drive device, not shown, is used based on an instruction of an operator or the operator him/herself executes a manual operation. When the lens unit 1000 is rotated, a relationship between the main scanning direction of the imaging unit 101 and an imaging space of the camera is physically changed. More specifically, assuming that the lens unit 1000 is rotated through 90 degrees, for example, a relationship between horizontal and vertical axes of the imaging unit 101 and horizontal and vertical axes of the imaging space of the camera prior to the rotation of the lens unit 1000 is reversed after the rotation.

Because of the foregoing fact, when the lens unit 1000 is rotated in photographing the moving photographic subject, the direction of the motion of the photographic subject may coincide with the main scanning direction of the imaging unit 101 after the rotation depending on a rotation angle of the lens unit 1000, which may consequently distort the image.

In order to deal with the problem, the external input signal Din indicating a predetermined state in the camera system is supplied to the CPU 201 in the preferred embodiment 2. In the present invention, a signal whose signal form is activated when the lens unit 1000 is rotated is selected as the external input signal Din. Examples of the signal used as the external input signal Din include: a drive signal of a rotation drive unit when the rotation drive unit for rotating the lens unit 1000 is provided in the camera system; and an output of a sensor for detecting the rotation, the sensor being provided in the case of the operator manually rotating the lens unit 1000. In the case of the external input signal Din as described, the predetermined state is the state in which lens unit 1000 is rotated.

The CPU 201 detects that the external input signal Din is activated and correspondingly starts the operation of the motion detecting unit 208, and further, starts to control the main scanning direction based on the motion detection information supplied from the operated motion detecting unit 208.

When the motion detecting unit 208 is constantly left in the operated state (active state), the power consumption is correspondingly increased. Therefore, in the preferred embodiment 2, the motion detecting unit 208 is halted on a steady basis and operated only when the external input signal Din is activated.

It is assumed that the direction of the motion of the photographic subject in the processed image signal is not the same as the main scanning direction (parallel or non-parallel) in the state in which the main scanning direction is set to the horizontal direction. Further assuming that the lens unit 1000 is rotated through 90 degrees, in response to which the direction of the motion of the photographic subject different to the main scanning direction results in the same direction as the main scanning direction, the external input signal Din is set to the activated state in response to the rotation of the lens unit 1000 and inputted to the CPU 201.

The CPU 201 receives the external input signal Din in the activated state and correspondingly starts the operation of the motion detecting unit 208. Thereby, the motion detecting unit 208 generates the motion detection information of the photographic subject and outputs it to the CPU 201. The CPU 201 receives the motion detection information and then judges whether or not the direction of the motion of the photographic subject in the processed image signal coincides with the current main scanning direction. When the two directions are judged to coincide with each other, the CPU 201 changes the main scanning direction to the vertical directions as shown in FIGS. 2B and 2D. As described, the main scanning direction is changed even when the direction of the motion of the photographic subject coincides with the current main scanning direction in response to the rotation of the lens unit 1000 so that the distortion of the image can be controlled.

Image Stabilizer for Camera Shake Due to Hand Movement in Pressing Shutter

The camera system shown in FIG. 3 comprises a shutter 1001. The shutter 1001 designates a timing of outputting the imaging signal from the output unit 104 based on the operation by the operator of the camera system. Because of a camera shake possibly occurring due to a hand movement when the shutter 1001 is pressed, the image may be distorted in the case in which the camera shake due to the hand movement, if any, occurs in the same direction as the direction of the motion of the photographic subject (parallel or non-parallel). In a modified example of the preferred embodiment 2, a signal indicating that the shutter 1001 is pressed is supplied to the CPU 201 as the external input signal Din. The predetermined state in the present example is a state in which the shutter 1001 is previously pressed.

The camera system comprises a camera shake detecting unit 1002 for detecting the camera shake generated when the operator operates the camera system and supplying a camera shake detection signal to the signal processing unit 205. The signal processing unit 205 corrects the image signal based on the camera shake detection signal supplied from the camera shake detecting unit 1002. The camera shake detection signal thus generated is supplied to the CPU 201 as the external input signal Din. In the present example, the predetermined state is a state in which the camera shake is generated.

The CPU 201 starts the operation of the motion detecting unit 208 and further starts to control the main scanning direction based on the motion detection information supplied from the operated motion detecting unit 208 when the external input signal Din (shutter switch signal/camera shake detection signal) is inputted thereto. Thereby, the distortion generated in the image when the camera shake is generated can be controlled.

It is assumed that the direction of the motion of the photographic subject in the processed images signal is not the same as the main scanning direction (same direction (parallel or non-parallel)) in the state in which the main scanning direction is set to the vertical direction. Further assuming that the shutter 1001 is pressed, in response to which the direction of the motion of the photographic subject different to the main scanning direction results in the same direction as the main scanning direction. The direction of the motion of the photographic subject in the assumption refers to, not a direction in which the photographic subject moves in an actual space, but a direction in which the photographic subject moves relative to the lens unit 1000 (actually a direction reverse to the direction in which the lens unit 1000 moves due to the hand movement) in response to the movement of the lens unit 1000 due to the hand movement generated when the shutter 1001 is operated.

When the shutter is thus operated, the external input signal Din to be inputted to the CPU 201 is activated. The CPU 201 detects that the external input signal Din is activated and correspondingly starts the operation of the motion detecting unit 208, and further, starts to control the main scanning direction based on the motion detection information supplied from the operated motion detecting unit 208.

Then, the CPU 201 having received the motion detection information of the photographic subject from the motion detecting unit 208 judges whether or not the direction of the motion of the photographic subject in the processed image signal coincides with the current main scanning direction. The CPU 201 changes the main scanning direction to the horizontal direction upon the detection that the two directions coincide with each other.

Judgment Based on Moving Image Encoding Amount

The I/F (Interface) unit 206 of the camera system may be adapted to function as a moving image encoding unit and execute a moving image compressing processing, such as MPEG, to the image signal. The I/F unit 206 encodes an inter-frame differential using a temporal redundancy. The differential amount increases when the distortion is generated, which inevitably tends to increase an moving image encoding amount. To put it differently, when the moving encoding amount is equal to or larger than a certain level, the image is probably distorted. In this modified example of the preferred embodiment 2, the I/F (Interface) unit 206 compares the counted moving image encoding amount to a specified value, and further, generates an excess encoding amount signal when the counted moving image encoding amount is larger than the specified value and supplies the excess encoding amount signal to the CPU 201 as the external input signal Din. The predetermined state in the present example is a state in which the encoding amount is larger than the specified value.

The CPU 201 starts the operation of the motion detecting unit 208 and starts to control the main scanning direction based on the motion detection information of the motion detecting unit 208 when the external input signal Din (excess encoding amount signal) is inputted thereto. Thereby, the image distortion in a high order in which the moving image encoding amount is excessive can be controlled. When the I/F unit 206 functions as the moving image encoding unit, the motion detecting unit is included therein. Therefore, it becomes unnecessary to separately provide the motion detecting unit 208.

Judgment Based on Changing Defect Correcting Direction

The image sensor 100 may undergo a white defect or a black defect due to a pixel fault on a process. In order to respond to the problem, the signal processing unit 205 in the camera system serves as a defect correcting unit. In the defect correcting unit, there are various algorithms, and an effect of the defect correction may be different in the horizontal direction and the vertical direction. When the effect of the defect correction is poor, the defect correcting unit changes a direction in which the defect is corrected based on the operation by the user. In this modified example of the preferred embodiment 2, the signal processing unit 205 supplies a defect correcting direction change signal to the CPU 201 as the external input signal Din. In the present example, the predetermined state is a state in which the defect correcting direction is changed by the defect correcting unit.

The CPU 201 starts the operation of the motion detecting unit 208 and starts to control the main scanning direction based on the motion detection information supplied from the motion detecting unit 208 when the external input signal Din (defect correcting direction change signal) is inputted thereto. Thereby, the distortion generated in the image when the effect of the defect correction is poor can be controlled.

The signal processing unit 205 executes the following control when instructing the change of the main scanning direction. The signal processing unit 205 corrects the defect in pre-correction data outputted from the AFE 203 using the memory 204. Then, the signal processing unit 205 horizontally and vertically converts the data when reading the data from the memory 204 and executes the image signal processing thereto in the signal processing unit 205.

Figure 4:
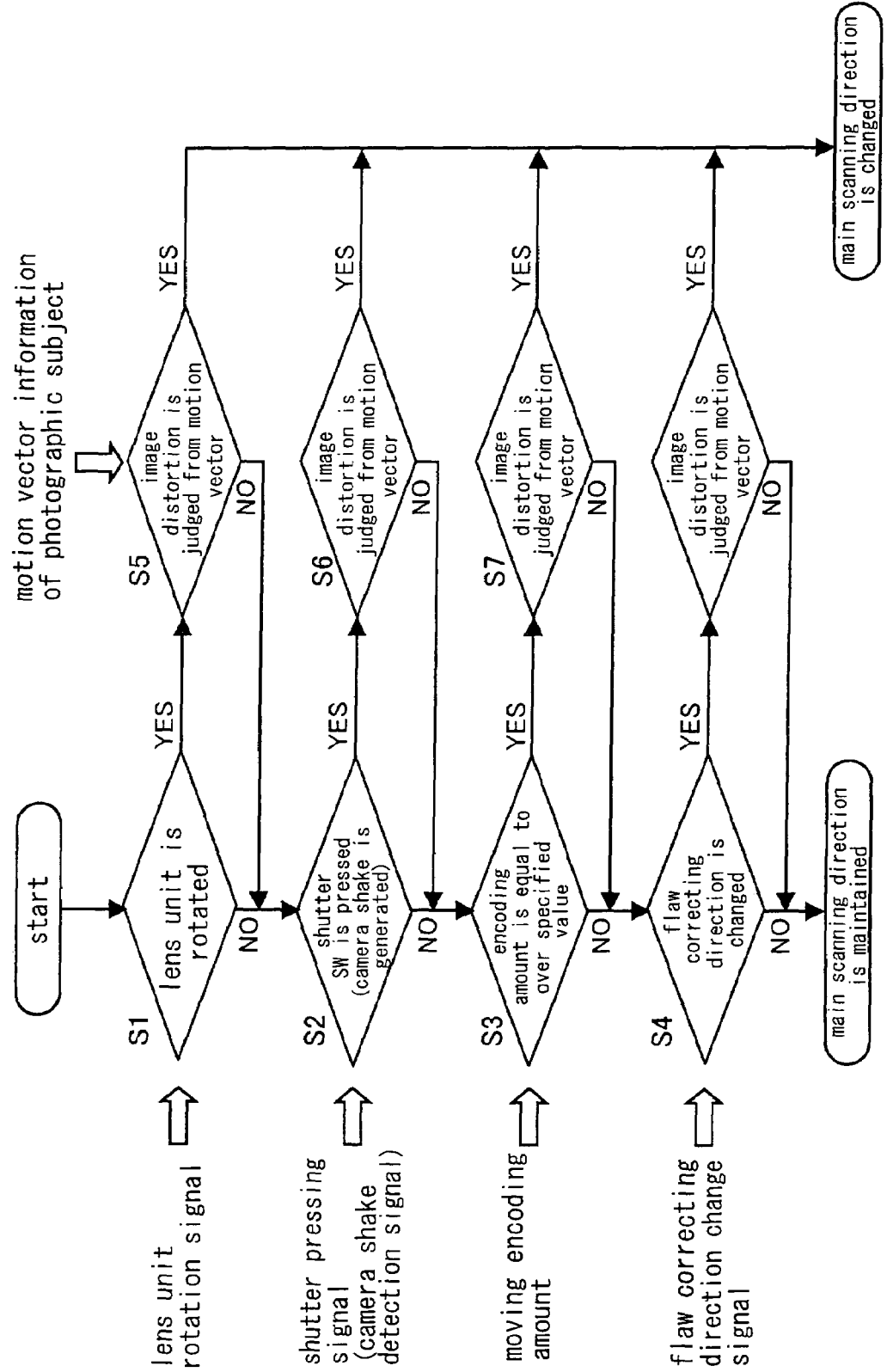
FIG. 4 is a flow chart of an operation of the camera system according to the preferred embodiment 2.

FIG. 4 is a flow chart of an operation of a generalized example in which the described four control manners according to the preferred embodiment 2 are assembled.

Steps S1 through S4 may not be necessarily executed in the shown order, and may be executed in random order. Further, all of the steps S1 through S4 are not necessarily executed.

Regarding the respective matters shown in the steps S1 through S4, the CPU 201 judges that the image is distorted from the motion vector of the photographic subject detected by the motion detecting unit 208 as in the steps S5 through S8, which can be omitted. When the respective steps S1 through S4 are executed, the CPU 201 may always control the changeover of the main scanning direction of the imaging unit 101.

Therefore, in the camera systems of the various manners, the main scanning direction is appropriately changed through the activation of the motion detecting unit when the external input signal is active so that the distorted image typically generated by the focal plane shutter can be controlled.

Embodiment 3

A preferred embodiment of the present invention, which is different to the preferred embodiments 2 and 3, relates to a camera system in which an image sensor not provided with the main scanning direction changing function is installed. In other words, the preferred embodiment 3 takes into account the application of the present invention to an image sensor of a conventional type.

FIG. 5 is a block diagram illustrating a constitution of a camera system according to a preferred embodiment 3 of the present invention. A lens unit 300 including an image sensor 100 comprises a rotation drive unit 301 and a rotation drive control unit 302. A CPU of a signal processing circuit 200 outputs a rotation drive volume control signal SL to the rotation drive control unit 302. The rotation drive control unit 302 controls a rotation drive of the lens unit 300 by the rotation drive unit 301 based on the supplied rotation drive amount control signal SL. The image sensor 100 does not comprise the main scanning direction control unit 105 which is provided in the preferred embodiments 1 and 2. The CPU 201 does not output the main scanning direction control signal. The CPU 201 serves as a rotation drive amount control signal generating device.

It is assumed that photographic subject is photographed and the motion vector of the photographic subject detected by the motion detecting unit 208 is from left to right along the horizontal direction or from right to left along the horizontal direction (parallel/non-parallel with motion vector). In this case, the CPU 201 outputs the rotation drive amount control signal SL for instructing the rotation control unit 301 of the lens unit to rotate the lens unit. The rotation drive amount control unit 302 controls the rotation drive unit 301 based on the supplied rotation drive amount control signal SL to thereby rotate the lens unit 300 through 90 degrees. The main scanning direction is not changed.

Thereby, the direction of the motion of the photographic subject in the processed image signal is changed to the direction different to the main scanning direction. As a result, the image distortion due to the operation of the focal plane shutter is controlled.

In the preferred embodiment 3, which is different to the preferred embodiments 1 and 2, the changeover of the main scanning direction of the imaging unit 101 is not controlled. Because of that, it becomes unnecessary to horizontally and vertically convert the image signal using the memory 204. Therefore, the memory 204 can be omitted. In the constitution provided with the memory 204 (constitution shown in FIG. 5), the memory control unit 207 and the memory 204 can be halted so that any excessive power consumption can be saved.

It takes a relatively large amount of time to rotate the lens unit 300. For example, in a camera system in which the shutter switch is pressed halfway to attain a focus or the like, the lens unit 300 is preferably adapted to rotate within a length of time when the focus is attained. Further, the preferred embodiment 3 can also use the external input signal Din in the same manner as in the preferred embodiment 2.

As described, according to the preferred embodiment 3, the rotation of the lens unit including the image sensor is controlled even in the camera system in which the image sensor not provided with the main scanning direction changing function is used. As a result, the generation of the image distortion resulting from the operation of the focal plane shutter can be controlled.

Embodiment 4

Figure 6:
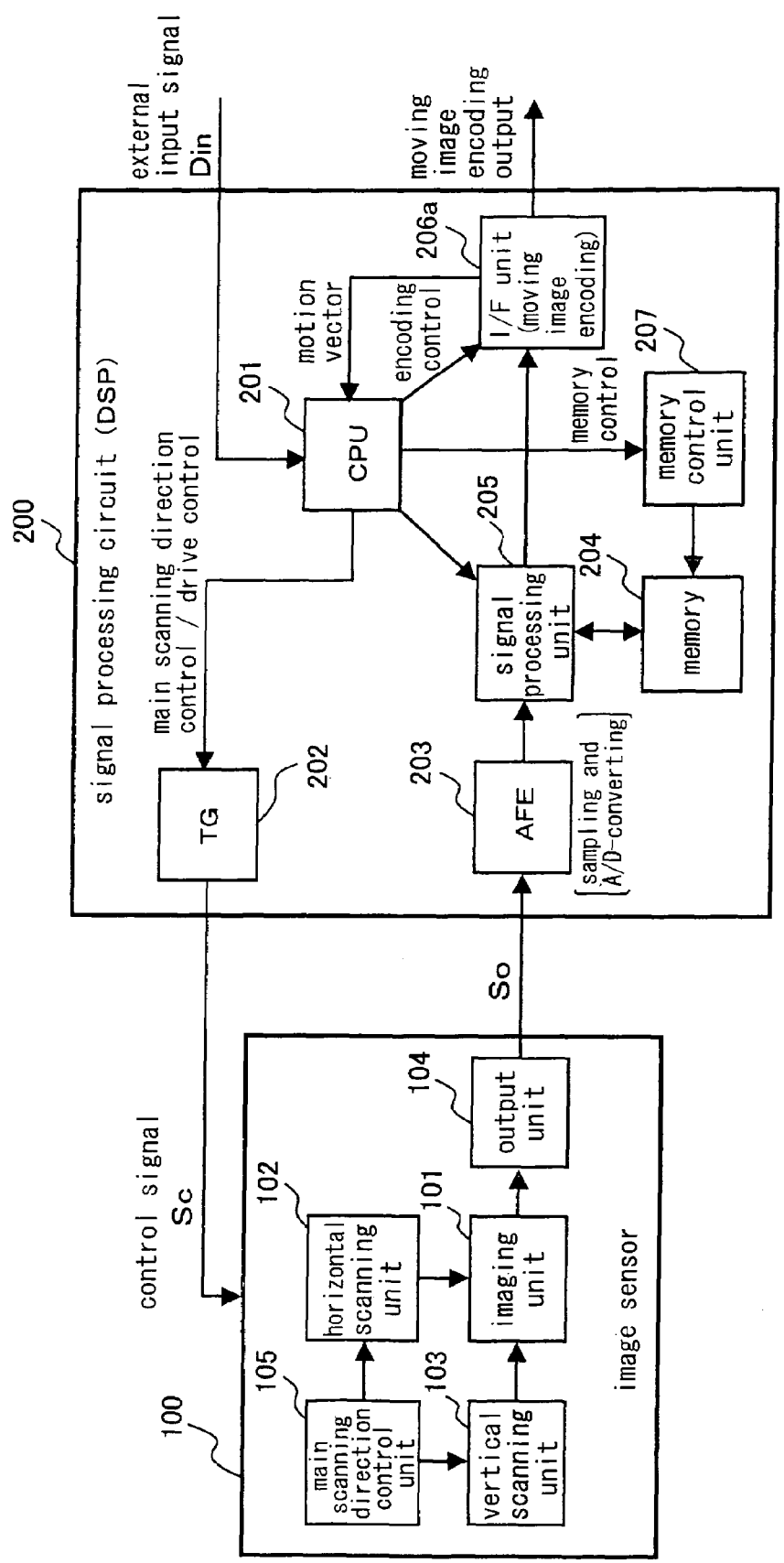
FIG. 6 is a block diagram illustrating a constitution of a camera system according to a preferred embodiment 4 of the present invention (first example).
Figure 7:
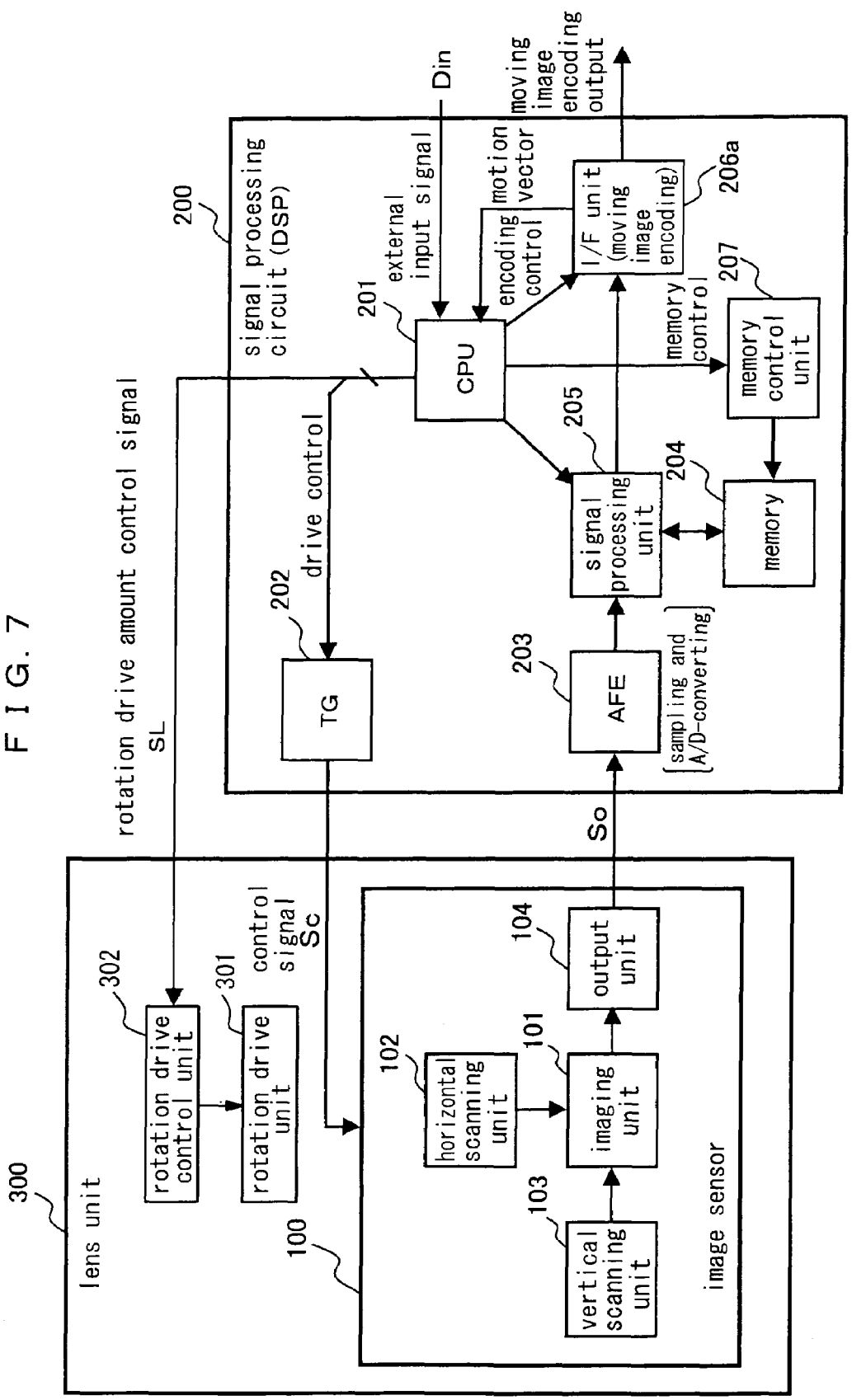
FIG. 7 is a block diagram illustrating a constitution of a camera system according to the preferred embodiment 4 (second example).

FIGS. 6 and 7 are block diagrams illustrating examples of a constitution of a camera system according to a preferred embodiment 4 of the present invention. These examples, which are different to the preferred embodiments 1 through 3, include a moving image encoding section in an I/F unit 206a. The moving image encoding section serves to detect the motion of the photographic subject.

Though described in the preferred embodiment 3, the moving image encoding such as the MPEG utilizes the temporal redundancy and encodes the inter-frame differential. Therefore, when the main scanning direction of the imaging unit 101 is changed or the lens unit 300 is rotated, the inter-frame relationship may be disturbed. If the inter-frame relationship is disturbed, the inter-frame differential is inevitably increased, which results in the increase of the moving image encoding amount.

In order to deal with the problem, in the preferred embodiment 4, the main scanning direction of the imaging unit 101 is changed or the lens unit 300 is rotated per frame. In the frames in which the main scanning direction of the imaging unit 101 is changed or the lens unit 300 is rotated, the CPU 201 controls the I/F unit 206a including the moving image encoding section so that the inter-frame differential is not encoded. In the frames, the I/F unit 206a including the moving image encoding section is controlled so that an intra-encoding processing, which is a moving image encoding using a spatial redundancy, is executed instead of encoding the inter-frame differential. The image quality can be improved by executing the intra-encoding processing.

Further, the consecutive changeover of the main scanning direction of the imaging unit 101 or the consecutive rotation of the lens unit 300 is subjected to a load of the signal processing and therefore difficult to be controlled, which is not desirable. Accordingly, the CPU 201 according to the preferred embodiment 4 controls the operation so that the main scanning direction of the imaging unit 101 is not changed or the lens unit 300 is not rotated during an optional number of frames N (N is a natural number). The frame number N to be set is externally settable by the operator.

As described, according to the present embodiment, the interface with the moving image encoding processing is attained, and the main scanning direction is not changed or the lens unit is not rotated in an abrupt manner in the camera system including the moving image encoding processing such as the camera-equipped mobile telephone system. As a result, the moving image encoding amount is alleviated, the image quality is maintained, and the burden from the signal processing can be avoided.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A camera system comprising: an imaging unit scanned by means of an X-Y address method; horizontal and vertical scanning units for scanning the imaging unit by means of the X-Y address method; a main scanning direction control signal generating unit for generating a main scanning direction control signal for designating a main scanning direction of the imaging unit; a main scanning direction control unit for controlling the horizontal and vertical scanning units so that the main scanning direction coincides with a direction instructed by the main scanning direction control signal; and an output unit for outputting an image signal read in consequence of scanning the imaging unit using the horizontal and vertical scanning units, wherein the main scanning direction control signal generating unit generates a motion vector of a photographic subject from the image signal outputted from the output unit, determines the main scanning direction based on the generated motion vector, and generates the main scanning direction control signal for designating the determined main scanning direction and the main scanning direction control signal generating unit sets the main scanning direction to a direction other than a direction in parallel/non-parallel with a direction of the motion vector.

2. A camera system as claimed in claim 1, wherein the imaging unit comprises a plurality of unit pixels arrayed in a vertical-horizontal matrix shape, wherein one of the unit pixels comprises a photoelectric conversion element for photo electrically converting an incident light, a reading section for reading an imaging signal obtained by the photoelectric conversion element and a reset section for resetting the photoelectric conversion element.

3. A camera system as claimed in claim 1, further comprising a memory for temporarily memorizing the image signal outputted from the output unit.

4. A camera system as claimed in claim 3, further comprising a memory control unit, wherein the memory control unit temporarily memorizes the image signal outputted from the output unit in the memory when the main scanning direction is changed by the main scanning direction control unit, and further vertically and horizontally changes an image direction when the image signal is read from the memory.

5. A camera system as claimed in claim 1, wherein the main scanning direction control signal generating unit generates the main scanning direction control signal only when the camera system is in a predetermined state.

6. A camera system as claimed in claim 5, further comprising a lens unit including the imaging unit and provided so as to freely rotate relative to the camera system, wherein the predetermined state is a state in which the lens unit is rotated.

7. A camera system as claimed in claim 5, further comprising a shutter for designating a timing of outputting the image signal from the output unit based on an operation by an operator, wherein the predetermined state is a state in which the shutter is operated.

8. A camera system as claimed in claim 5, further comprising a camera shake detecting unit for detecting a camera shake due to a hand movement generated when an operator operates the camera system, wherein the predetermined state is a state in which the camera shake is detected by the camera shake detecting unit.

9. A camera system as claimed in claim 5, further comprising a moving image encoding unit for executing a moving image encoding processing to the image signal, wherein the predetermined state is a state in which a moving image encoding amount in the moving image encoding processing by the moving image encoding unit exceeds a previously specified value.

10. A camera system as claimed in claim 5, further comprising a defect correcting unit for correcting a pixel defect of the imaging unit and capable of changing a direction in which the pixel defect is corrected, wherein the predetermined state is a state in which the pixel defect correcting direction is changed by the defect correcting unit.

11. A camera system as claimed in claim 1, further comprising a moving image encoding unit for executing a moving image encoding processing to the image signal, wherein the moving image encoding unit shifts to an intra-encoding processing using a spatial redundancy when the main scanning direction is changed by the main scanning direction control unit in a state in which an inter-encoding processing for encoding an inter-frame differential using a temporal redundancy is executed.

12. A camera system as claimed in claim 11, wherein the main scanning direction control unit inactivates the main scanning direction control signal during at least one frame when the main scanning direction is changed.

13. An image sensor comprising: an imaging unit scanned by means of an X-Y address method; horizontal and vertical scanning units for scanning the imaging unit by means of the X-Y address method; a main scanning direction control unit for controlling the horizontal and vertical scanning units so that a main scanning direction of the imaging unit coincides with a direction instructed by a main scanning direction control signal inputted from outside said main scanning direction control signal being generated by a main scanning direction control signal generating unit and input to said main scanning direction control unit; and an output unit for outputting an image signal read in consequence of scanning the imaging unit using the horizontal and vertical scanning units wherein the main scanning direction control signal generating unit sets the main scanning direction to a direction other than a direction in parallel/non-parallel with a direction of the motion vector.

* * * * *